United States Patent [19]

Foulquier et al.

[11] Patent Number: 5,221,154
[45] Date of Patent: Jun. 22, 1993

[54] DEVICE FOR RETAINING A SHAFT HOUSED AT LEAST PARTIALLY IN A SLEEVE, WHICH PARTS ARE CAPABLE OF RELATIVE TRANSLATIONAL AND ROTATIONAL MOTION, AND ITS APPLICATION TO MOTOR VEHICLE STEERING SYSTEMS

[75] Inventors: Jacques Foulquier; Sylire Baudon, both of Vendome, France

[73] Assignee: NACAM, Vendome, France

[21] Appl. No.: 713,420

[22] Filed: Jun. 10, 1991

[30] Foreign Application Priority Data

Jun. 19, 1990 [FR] France ............... 90 07669

[51] Int. Cl.⁵ ........................................... F16B 21/09
[52] U.S. Cl. .............................. 403/12; 403/322; 403/326; 403/377; 403/DIG. 7; 74/492
[58] Field of Search ............ 403/326, 322, 12, 109, 403/377, DIG. 7; 74/492; 464/160, 162

[56] References Cited

U.S. PATENT DOCUMENTS

| 3,538,785 | 11/1970 | Grancon | 74/492 |
| 3,679,244 | 7/1972 | Reddy | 403/109 |
| 4,329,076 | 5/1982 | Coreth | 403/109 |
| 4,504,164 | 3/1985 | Bien | 403/109 |
| 4,505,058 | 3/1985 | Peterson | 403/326 |
| 5,027,674 | 7/1991 | Nolte et al. | 403/109 |
| 5,060,903 | 10/1991 | Schwörer | 403/109 X |
| 5,098,241 | 3/1992 | Aldridge | 403/109 |

FOREIGN PATENT DOCUMENTS 3623560 1/1988 Fed. Rep. of Germany.
2163207 2/1986 United Kingdom.

Primary Examiner—Dave W. Arola
Assistant Examiner—Heather Chun
Attorney, Agent, or Firm—Emmanuel J. Lobato; Robert E. Burns

[57] ABSTRACT

A shaft retaining device having a shaft selectively retained as to translation and rotational movement. A sleeve coaxial with the shaft encloses a length of the shaft. The shaft has an outwardly projecting cam within the sleeve. A cam follower carried by the sleeve has a part thereof within the sleeve in a plane normal to the shaft axis and is cammed away from the shaft by the cam. The cam and cam follower have complementary profiles, one of which is a male profile and the other is a female profile, in which the cam and cam follower engage other effectively selectively immobilizing the shaft and sleeve as to relative translation movement when the cam and cam follower engage each other.

17 Claims, 3 Drawing Sheets

DEVICE FOR RETAINING A SHAFT HOUSED AT LEAST PARTIALLY IN A SLEEVE, WHICH PARTS ARE CAPABLE OF RELATIVE TRANSLATIONAL AND ROTATIONAL MOTION, AND ITS APPLICATION TO MOTOR VEHICLE STEERING SYSTEMS

FIELD OF THE INVENTION

The invention relates to the temporary immobilization of a shaft housed at least partially in a sleeve, which parts are capable of relative translational and rotational motion with respect to a common longitudinal axis, and relates more particularly to the case of motor vehicle steering columns.

The subjects of the invention are more particularly a device for retaining a shaft housed at least partially in a sleeve, which parts are capable of relative translational and rotational motion with respect to a common axis, and the application of such a device to steering columns, in particular of motor vehicles.

DESCRIPTION OF THE PRIOR ART

In numerous fields of activity, shafts are used which are housed at least partially in a sleeve, which parts are capable of relative translational and rotational motion and which must at least momentarily be immobilized relative to each other in terms of translational, and possibly rotational, motion so that they can rotate only by a specified arc during their use and in particular during the installation and assembly processes, and this takes place before they are subsequently installed.

This type of situation is encountered, for example, in the automotive industry when a steering column is installed on the structure or shell of a vehicle. Indeed, when such a steering column is fitted, the end of the shaft of the latter, which is opposite that which will receive the steering wheel, must be connected to a mechanical or hydraulic control box which joins this shaft to the mechanism which enables the set of steered wheels to be oriented as a function of the rotation imparted to the steering wheel by the driver.

Such a steering column is usually present in the form of a subassembly, possibly equipped with a steering wheel, which must occupy a relatively well defined position with respect to the dashboard which is often already at least partially pre-equipped. During these fitting operations, the steering wheel and the underlying parts of the dashboard must not intimately come into contact since such a contact would be likely to damage them, or to cause noise, or even to render inoperative parts of control systems such as those ensuring the return of the turn indicator lamps or "flasher lamps" if, for example, the steering wheel is too far away from the dashboard. Furthermore, in order to facilitate the joining of the end of the shaft to the control box mentioned above, it is particularly judicious for both the angular and axial position of this shaft end to be well defined, at least within certain limits, since the connection is usually made blind in a highly restricted space to which access is very difficult.

GENERAL DESCRIPTION OF THE INVENTION

The object of the invention is to overcome this type of disadvantages, in particular during assembly operations on assembly lines in the automotive industry.

The subject of the invention is a device for retaining a shaft housed at least partially in a sleeve, which parts are capable of relative translational and rotational motion with respect to a common longitudinal axis. This device is notable in that it comprises a cam which is carried by the shaft and, is situated at its periphery and is integral with it both in terms of translational and rotational motion, a cam follower with a feeler, which cam follower is intended to cooperate with this cam, is carried by the sleeve and is situated at least partially inside the sleeve in a fixed plane perpendicular to the axis and which is mounted so as to be able to move in this plane virtually radially, this cam and this cam follower having respective specific complementary male and female profiles which are intended to engage in each other, a resilient member which acts on this cam follower and which tends normally to separate the cam follower from the cam, securing means which are intended to cooperate with this resilient member in order to place it in a first tensioned state of metastable equilibrium in which the cam and cam follower are in contact and their profiles are engaged at least partially so that the shaft and the sleeve, on the one hand, are immobilized in terms of translational motion and, on the other hand, are capable of rotational motion by a specified arc less than 360°, and in a second slightly tensioned state of relatively stable equilibrium in which the cam and cam follower are separated and their profiles are disengaged at least partially so that the shaft and the sleeve are completely free in terms of translational and rotational motion, the change from the first to the second state resulting from a cam/cam follower contact following a rotation greater than the arc in question whilst the resilient member is in its first state.

The subject of the invention is also the application of such a device to the steering columns of motor vehicles, where this rotation greater than the specified arc is that of the shaft intended to carry a steering wheel.

BRIEF DESCRIPTION OF THE DRAWINGS

Other features of the invention will emerge from reading the description and the claims which follow, and from examining the attached drawing given purely by way of example, in which:

DESCRIPTION OF PREFERRED EMBODIMENTS

Figure 1:
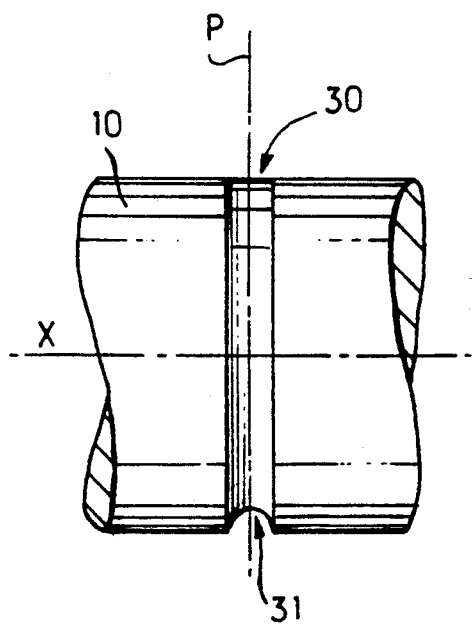
FIG. 1 is a partial diagrammatic view in elevation of a shaft of the device according to the invention.

In what follows, a device will be described for retaining a shaft housed at least partially in a sleeve according to the invention in its particular application to a motor vehicle steering system.

Since the fitting of a shaft in a sleeve is well known in the prior art, and especially in the automotive industry, only that which relates directly or indirectly to the invention will be described. For the remainder, the person skilled in the art in question will draw from the current conventional solutions available to him in order to deal with the particular problems with which he is faced.

In what follows, a same reference numeral will always be used to identify an identical element.

For the sake of convenience, in the description, the various components of a device for retaining a shaft housed at least partially in a sleeve, which parts are capable of relative translational and rotational motion with respect to a common longitudinal axis, according to the invention, will be described successively before explaining how they operate.

As can be observed with reference to the various figures in the drawing, a device for retaining a shaft housed at least partially in a sleeve, which parts are capable of relative translational and rotational motion with respect to a common longitudinal axis, which is in accordance with the invention essentially comprises, inter alia, a shaft 10, a sleeve 20, a cam 30, a cam follower 40, a resilient member 50, securing means 60 and possibly an element 70 which enables, in particular, these securing means 60 to be made captive.

The shaft 10, for example a hollow metal shaft (FIGS. 5A, 5B) or solid metal shaft (FIGS. 1, 2, 3A, 3B), in one or more sections joined, for example, by universal joints, is housed at least partially in the sleeve 20 where it is carried by bearings, not shown, of any appropriate types. This shaft and this sleeve have a common longitudinal axis X with respect to which they are normally capable of relative translational and rotational motion.

The sleeve 20, made for example from a metal tube, is pierced locally with an orifice 21, and possibly with an aperture 22, which parts will be returned to later.

Figure 2:
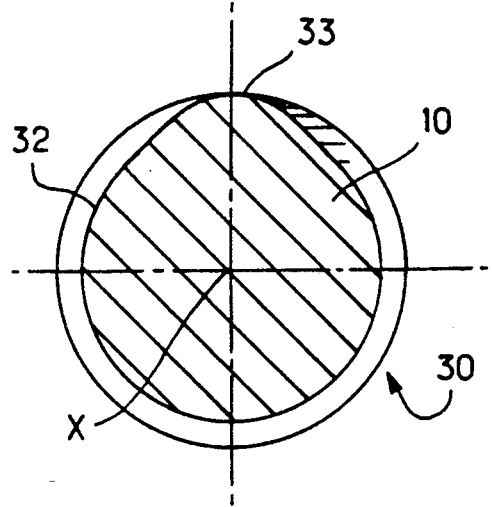
FIG. 2 is a section along the plane P in FIG. 1.
Figure 3A:
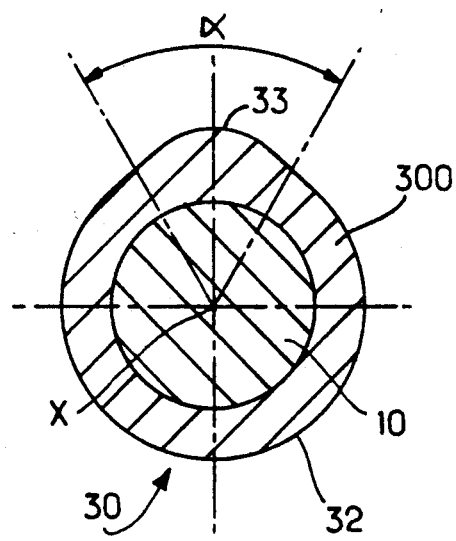
FIGS. 3A and 3B are sections similar to the section in FIG. 2 of two other alternative embodiments.
Figure 3B:
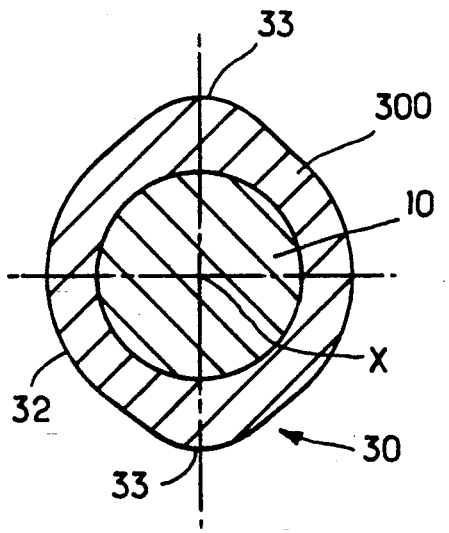
Figure 5A:
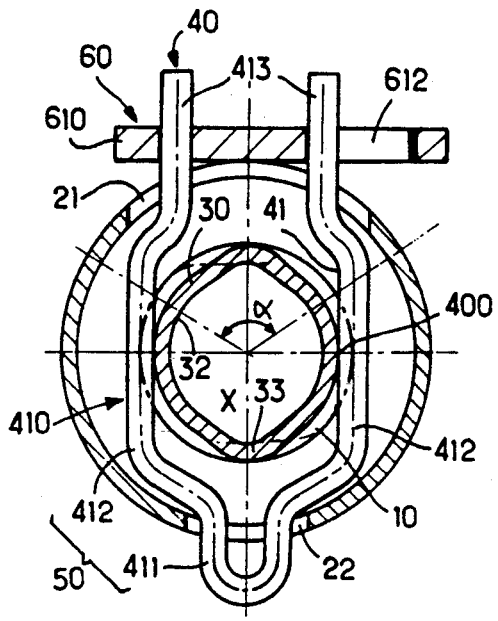
FIGS. 5A and 5B are diagrammatic partial sections along the plane P of an embodiment of the device according to the invention, respectively in each of its two different states.
Figure 5B:
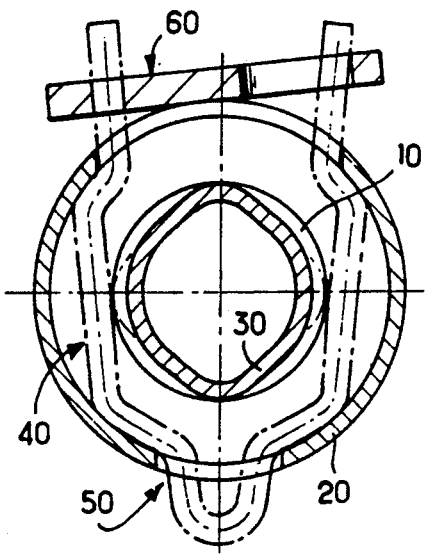
Figure 6:
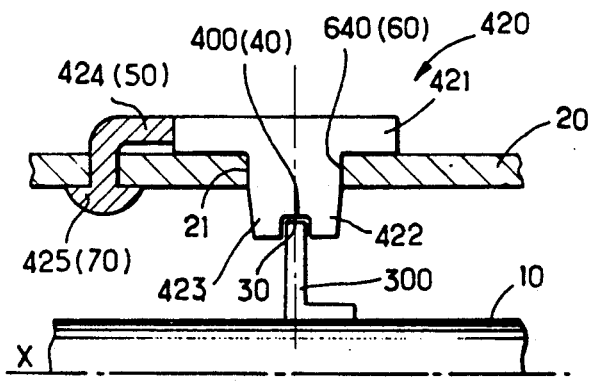
FIG. 6 is a diagrammatic view in meridional section of another embodiment.
Figure 7:
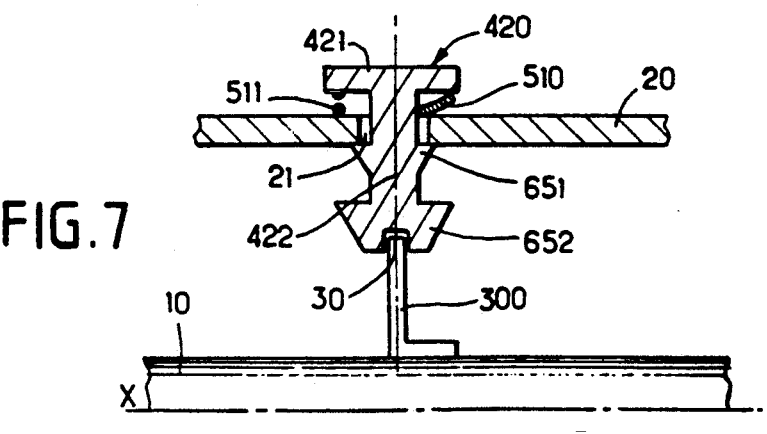
FIG. 7 is a view similar to that in FIG. 6 of an alternative of this embodiment with, partially, two forms of construction.

The cam 30 has a profile 31 either in the form of a groove, i.e. female (FIGS. 1, 2, 5), or in the form of a flange, i.e. male (FIGS. 6, 7), with a curved (FIG. 1) or polygonal (FIGS. 6, 7) cross-section. This cam can either be set back with respect to the periphery of the shaft, as illustrated in FIGS. 1 and 2 and in FIGS. 5A and 5B, or on the contrary can project, as illustrated in FIGS. 6 and 7. It will therefore be understood that, depending on whether the profile 31 is a depression or a protuberance, it performs the role of a female or male element respectively. As can be observed, the cam 30 is present in the manner of a circle 32 or the like with at least one lobe 33 (FIGS. 2, 3A), and preferably two diametrically opposite lobes (FIGS. 3B and 5A, 5B). This cam is arranged in a plane P perpendicular to the axis X and occupying a fixed position both in terms of rotational and translational motion with respect to the shaft 10. The cam 30 is made directly on the shaft, as illustrated in FIGS. 1, 2, 5A and 5B, or alternatively formed on a collar 300 which is attached to the shaft 10 and immobilized on the latter both in terms of rotational and translational motion by any appropriate conventional technique such as keying, welding, grooving or force-fitting. An attached cam 30 is illustrated in FIGS. 3A, 3B, 6 and 7.

The cam follower 40, intended to be placed in the plane P and to move therein radially at least locally, is equipped with a feeler 400 intended to cooperate directly with the cam 30. This cam follower has a profile 41 in the form of a bar, i.e. male, or in the form of a groove, i.e. female, adapted to the profile 31 in order to constitute a complementary male or female element depending on the type of profile 31.

As can be seen for the embodiment in FIGS. 5A and 5B, the cam follower 40 is present in the manner of a clip 410 or a similar element with and elbowed base 411 which connects limbs 412 equipped with end prongs 413. At least one of these limbs 412 serves locally as a feeler 400. This clip is, for example, made from piano wire.

For the embodiment illustrated in FIGS. 6 and 7, the cam follower 40 is formed in the manner of a "stud" 420 or a similar element which defines a head 421, a body 422 and a socket 423. As can be observed in FIG. 6, the head 421 is extended by a tongue 424 terminating in a fixing means 425. For the alternative of this embodiment illustrated in FIG. 7, it can be seen that a Belleville washer 510 (left-hand part) or a helical spring 511 (right-hand part) is inserted between the head 421 and the sleeve 20 in order to stress the cam follower outwards. The free part of the socket 423, pointing toward the axis X, serves locally as a feeler 400.

Figure 4A:
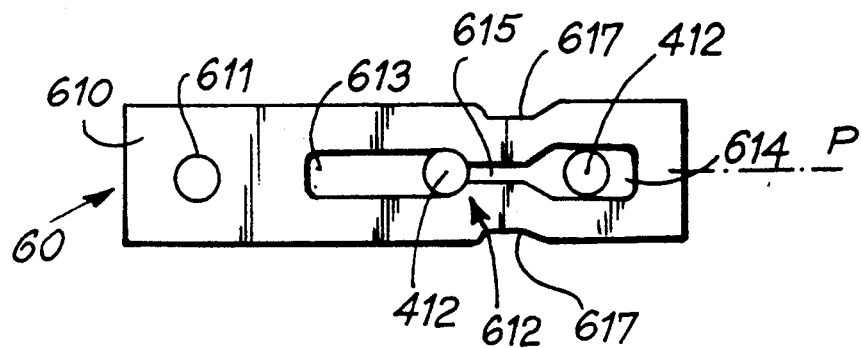
FIGS. 4A, 4B and 4C are diagrammatic partial top views of various alternative embodiments of the securing means of the retaining device according to the invention.
Figure 4B:
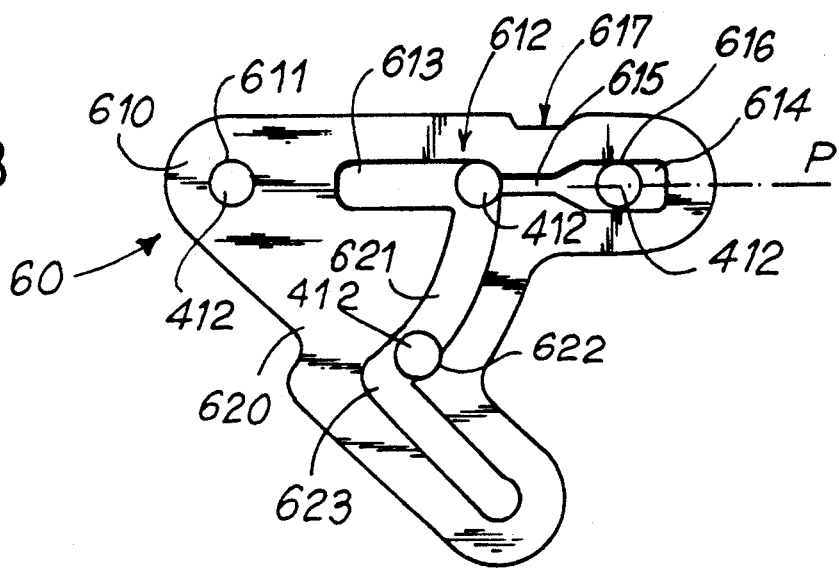
Figure 4C:
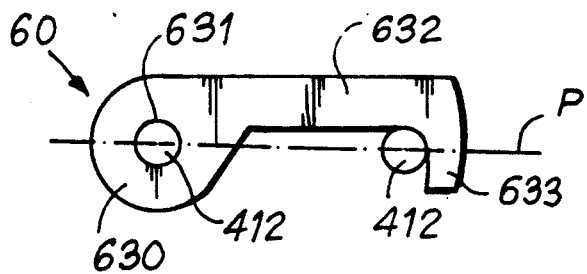

The securing means 60 are illustrated in FIGS. 4A, 4B and 4C for various alternatives of an embodiment. These securing means 60 comprise a plate 610 pierced with a hole 611 and with a slot 612 composed of an oblong hole 613 and of an elongated hole 614 which are joined together by a narrow channel 615. For the alternative embodiments in FIGS. 4A and 4B, the elongated hole 614 is equipped with a bevel in the direction of the channel 615, and the plate has at least one recess 617 cut into it perpendicular to the channel. This is clearly illustrated. For the alternative embodiment in FIG. 4B, the plate 610 is equipped with an additional part 620 which is pierced with a curved corridor 621, virtually centered on the hole 611. A bearing part 622 is formed in the corridor as illustrated. This corridor is extended by a passage 623 which, as can be observed, is radial and centrifugal with respect to the hole 611. As can be seen, the corridor 621 opens into the oblong hole 613, and the passage 623 opens into the corridor 621. For the alternative embodiment in FIG. 4C, the securing means 60 are in the form of a plate 630 pierced with a hole 631 and equipped with an arm 632 terminating in a nose 633.

For the alternative in FIG. 6 of the illustrated embodiment of the securing means, the body 422 preferably has a tapering or conical configuration 640 so as to narrow and to have a certain "clearance" as it were in a centripetal direction. For the alternative in FIG. 7 of this embodiment of the securing means, the body 422 is equipped with a breakable or retractable abutment 651, and with a stop device 652. This will be returned to later. The abutment 651 is close to the head 421, and the stop device is close to the socket 423.

The securing means 60 are, for example, made from a molded synthetic material.

The resilient member 50 is of a different type depending upon the embodiments and the alternatives. For the embodiment in FIGS. 5A and 5B, the clip 410 is made from piano wire, i.e. from a resilient metal wire, and it is the base 411 and at least one of the limbs 412 which perform the role of a resilient member, as will be understood later. For the embodiment in FIG. 6, it can be seen that the tongue 424 performs the role of a resilient member, whilst for the alternative embodiment in FIG. 7 the Belleville washer 510, as illustrated in the upper right-hand part, or alternatively the helical spring 511, as illustrated in the upper left-hand part, performs the role of a resilient member.

An element 70 is preferably associated with the securing means 60 in order to render them captive. This is illustrated, for example, in FIG. 6 where this element is formed by the fixing means 425 which, in this embodiment, is formed in the manner of a rivet. It is clear that this element can consist, for example, of an expandable stud or alternatively result from an upsetting operation or from a bent-back part formed on the prong 413 engaged in the hole 611. This element can consist of a single piece, forming an integral part with the securing means, or alternatively be attached.

Irrespective of the embodiment and its alternative, the securing means 60 are always intended to cooperate with the resilient member 50. These securing means cooperate with the resilient member in order to retain it in a first tensioned state of metastable equilibrium in which the cam and cam follower are in contact and their profiles are engaged at least partially so that the shaft and the sleeve, on the one hand, are immobilized in terms of translational motion and, on the other hand, are capable of rotational motion by a specified arc α which is less than 360° and can, in certain circumstances, be zero. These securing means cooperate with the resilient member in order to place it in a second slightly tensioned state of relatively stable equilibrium in which the cam and the cam follower are separated and their profiles disengaged at least partially so that the shaft and the sleeve are completely free in terms of both rotational and translational motion. The change from the first to the second state of the resilient member results from a contact between the cam and the cam follower when the resilient member is in its first state and when a relative rotation is imparted to the shaft and to the sleeve which is greater than the arc α mentioned.

Reference will now be made to FIGS. 5A and 5B in which the embodiment illustrated is equipped with securing means according to FIG. 4A. All the components of the device according to the invention are joined together and fitted as in the drawing. As can be observed, the orifice 21 which pierces the sleeve 20 has an elongated configuration so as to permit the insertion of the clip 410 in such a way that the end prongs 413 can move therein relatively freely in the plane P perpendicular to the axis X. The elbowed base 411 of the clip is engaged in the aperture 22 of oblong configuration. Once the clip is installed, it is normally situated, by virtue of its inherent elasticity, in a slightly tensioned state in which its limbs 412 are relatively spaced apart from each other, which position permits the insertion of the shaft 10. This is illustrated in FIG. 5B. It can be seen that one of the prongs 413 is engaged in the hole 611 and that the other of these prongs lies in the elongated hole 614. If the clip is now placed in the situation in which it is shown in FIG. 5A, in which its limbs 412 are relatively close and parallel, it can be seen that at least one of these limbs then engages in the cam 30. In the situation illustrated in FIG. 5A, one of the prongs 413 of the clip is engaged in the hole 611 of the plate 610, whilst the other one of the prongs, as is clear upon examination of FIG. 4A, lies in the oblong hole 613 and rests in the latter at the entrance of the channel 615. In this embodiment, the feeler 400 of the cam follower 40 consists of the part of the limb or of the limbs 412 which bear against the circle 32 of the cam 30. In this case, the cam 30 is in a groove set back with respect to the periphery of the shaft 10. When the device is in the situation illustrated in FIG. 5A, it can be seen that the resilient member is in a tensioned state and that, because of the penetration of the limbs of the cam follower into the groove of the cam, the shaft and the sleeve are immobilized in terms of translational motion and cannot slide along the axis X. Similarly, it can be seen that as long as the lobe or lobes 33 of the cam do not strike the feeler of the cam follower, the shaft and the sleeve can rotate relative to each other by a specified arc α which is less than 360°. If the shaft and the sleeve are rotated relative to each other and if, once one of the lobes is in contact with the cam feeler, a torque is exerted which tends to oppose the force of the resilient member and if this force is overcome, the limbs are pushed back and forced to move apart. If FIG. 4A is examined, it can then be seen that the prong 413 which is in the oblong hole 613 is pushed back into the channel 615 in the direction of the elongated hole 614. The nature of the material from which the plate is made, and the dimensions of the channel, of the prong and of the recess or recesses 617 which are optionally formed make it possible to adjust the force which must be applied in order to cause one of the prongs to escape from the oblong hole and to push it back into the channel towards the elongated hole. It can therefore be seen that, at the end of operation, the device according to the invention is again situated in the position in which it is illustrated in FIG. 5B.

It will be understood that the presence of the bevel 616 formed in the elongated 614 in proximity to the channel 615 makes it possible to "arm" or "rearm" the resilient member 50 in order to bring it from the position in which it is illustrated in FIG. 5B, corresponding to the second state, into that in which it is illustrated in FIG. 5A, corresponding to the first state. This makes it possible to neutralize or to rearm the device according to the invention as desired.

Reference will now be made to the alternative in FIG. 4B of this embodiment for the case where the plate 610 is equipped with an appendix 620; it is possible to rotate this plate in its plane about the prong 413 which is engaged in the hole 611. This alternative is particularly well suited for the case where a steering column is preassembled at a location other than that where it is actually installed on a vehicle. In order to permit the engagement of the shaft into its sleeve during the preassembly of the column, the plate is placed so that one of the prongs 413 is in the passage 623 and rests in the latter against its end opposite the hole 611 in which the other prong 413 is engaged. It will hence then be understood that the clip is in the situation illustrated in FIG. 5B where the resilient member is in its second state. Once this operation is finished, the prongs and limbs of the clip are brought together using any appropriate technique so that the prong in the passage enters the corridor and rests in the bearing part 622. The resilient member is in its first state and the clip is in the situation illustrated in FIG. 5A. The shaft and the sleeve are then immobilized relative to each other, completely in terms of translational motion and partially in terms of rotational motion. In this situation, it is impossible for the resilient member of the clip to relax spontaneously in the event of impacts or vibrations which do not fail to occur, for example during transfer. During the operation of fitting the preassembled steering column on a vehicle, it is sufficient to swivel the plate in its plane for the moveable prong of the clip to occupy a position similar to that which is illustrated in FIG. 4A, in which situation there is always a relative immobilization of the shaft and the sleeve, which immobilization can be neutralized in order to make the sleeve and the shaft completely free in terms of both translational and rotational motion by dislodging the moveable prong from the oblong hole and moving it into the elongated hole after passing through the channel, as indicated above.

In the alternative in FIG. 4C, the securing means 60 are formed in the manner of a hook or the like. The arming of the resilient member is effected by bringing together the prongs and limbs of the clip and by securing the moveable prong behind the nose 633, whilst the other prong is engaged in the hole 631. The change from the first tensioned state to the second slightly tensioned state then results either from a deformation of the arm 632 and/or of the nose 633, or alternatively from a swiveling of the plate 630 which rotates about the prong engaged in the hole 631. This is dependent on the choice of the type of materials and of the dimensions of the components of the device according to the invention.

Reference will now be made to the embodiment which is illustrated in two alternatives in FIGS. 6 and 7. As can be seen immediately in this embodiment, the cam 30 projects from the shaft 10 and has a male profile 31 in the form of a flange, whilst the cam follower 40 is present in the form of a female profile 41 in the form of a groove. In this embodiment, the securing means 60 are present in the form of a "stud" or similar element.

In the alternative embodiment in FIG. 6, the orifice 21 of the sleeve is, for example, a bore with a cross-section which is preferably circular in one direction and, for example, conical, tapering in the direction of the axis X in a perpendicular direction. The body 422 of the stud has a complementary geometry 640, for example conical, and is engaged by force in the orifice 21. The situation illustrated in FIG. 6 corresponds to the first tensioned state of the resilient member 50, the role of which is performed by the tongue 424. It will be understood that if the sleeve and the shaft are rotated relative to each other, preferably the shaft, the lobe of the cam strikes the feeler of the cam follower from which it is normally at a distance, and exerts a centrifugal thrust which tends to dislodge the body 422 of the stud 420 from the orifice. As soon as this tendency has begun, the tongue 424 which serves as a resilient member 50 assumes its second state and relaxes, preferably pulling the stud completely out of the sleeve and joined to the latter by the fixing means 425 which serves as an element 70 for making it captive.

In the alternative embodiment illustrated in FIG. 7, the stud 420 is engaged in the orifice 21 which preferably has a non-circular cross-section in order to maintain the relative orientation of the cam and the cam follower. The body 422 is equipped with an abutment 651 and with a stop device 652. The abutment and the stop device are of a type such that they permit the insertion, for example by means of a manual thrust or on a press, of the stud into the sleeve through the orifice 21, as illustrated. It is the abutment 651 which is present for example in the form of retractable or breakable lugs, which positions the cam follower in such a way that it is on the trajectory which the lobe of the cam can describe when the shaft rotates, whilst at the same time retaining the resilient member 50 in its first tensioned state. The resilient member consisting of the helical spring 511 or the Belleville washer 510 tends to stress the stud in the centrifugal direction. It will be understood that, if the shaft and the sleeve are rotated relative to each other, the contact of the feeler and in particular of the lobe with the cam follower tends to push the stud back outwards, causing the abutment 651 to yield. When it assumes its second slightly tensioned state by virtue of its relaxation, the resilient member then causes the stud to be displaced outwards, the stud then, however, being retained by the stop device 652 which performs the role of an element 70 making the securing means, in this case the stud, captive.

In the embodiment illustrated in FIGS. 5A and 5B, it will be understood that the element 70 which makes the securing means 60 captive can be formed by upsetting the end prong 413 which is engaged in the hole 611 of the plate, or alternatively by bending this prong. In this embodiment, a clip made from piano wire has been used, made from a steel wire of circular cross-section. It is clear that it is also possible to use a U-section profile in the case where the cam, attached or otherwise, projects from the shaft, as illustrated in FIGS. 6 and 7. The manufacture of the cam 30 can take place using any current conventional technique with or without material removal.

The advantage of the device according to the invention can be fully understood, which device can if necessary be rearmed and which makes it possible, in one state, to immobilize at least temporarily in terms of translational motion and partially in terms of rotational motion a sleeve and a shaft which are capable of relative translational and rotational motion with respect to a common axis and, in another state, to free them completely. It can be appreciated that this device finds a particularly judicious application in the automotive industry and especially for steering columns.

What is claimed is:

1. A shaft retaining device comprising:
    a rotatable shaft to be selectively retained as to translation and rotational movement;
    a sleeve enclosing a length of said shaft, said shaft and sleeve being capable of relative translational and relative rotational movement with respect to a common longitudinal axis;
    a cam carried by said shaft on a periphery thereof and movable jointly with the shaft;
    a cam follower carried by said sleeve cooperative with said cam;
    said cam follower having a part thereof within the sleeve in a plane normal to said axis and capable of moving in said plane radially away from the shaft;
    said cam and said cam follower having complementary coactive profiles, one of which is a male profile and another which is a female profile in which the cam and the cam follower engage each other;
    a resilient member acting on said cam follower tending normally to bias the cam follower away from the cam;
    securing means coactive with said resilient member for placing the resilient member in a first tensioned state of metastable equilibrium in which said profiles are engaged effectively immobilizing the shaft and the sleeve as to relative translation movement and remaining capable of relative rotational movement in a specified arc less than 360 degrees and in a second slightly tensioned state of relatively stable equilibrium in which the cam and the cam follower are separated and said profiles thereof are at least partially disengaged so that the shaft and sleeve are effectively free for relative translational and relative rotational movement; and a change from said first state to said second state being effected from a cam and cam follower contact following a relative rotation greater than said arc while the resilient member is in said first state thereof.

2. A shaft retaining device according to claim 1, in which said cam is circular with at least one lobe projecting in a direction outwardly of the shaft.

3. A shaft retaining device according to claim 1, in which said cam is a recess on the periphery of said shaft.

4. A shaft retaining device according to claim 1, in which said cam projects outwardly with respect to the periphery of said shaft.

5. A shaft retaining device according to claim 1, in which said cam is integral with said shaft.

6. A shaft retaining device according to claim 1, including a collar fixed on said length of said shaft and said cam is fixed on said collar.

7. A shaft retaining device according to claim 1, in which said cam follower comprises an open clip having two limbs about said shaft internally of said sleeve and having end portions extending outwardly through said sleeve, said sleeve having an opening through which said end portions extend outwardly of said sleeve, one limb defining a feeler having the profile of said cam for engaging the profile of the shaft, and the clip having a base defining said resilient member.

8. A shaft retaining device according to claim 7, in which said securing means comprises a plate outwardly of said sleeve coactive with said limbs of said clip in variable restrain thereof for effecting coaction with the resilient member on the first tensioned state and the second tensioned state thereof.

9. A shaft retaining device according to claim 8, in which said plate has elongated individual slots through which said limbs extend individually, and each said slots having an individual configuration for effecting selectively said variable restraint of a corresponding limb therein.

10. A shaft retaining device according to claim 8, in which said plate comprises an opening into which one of said limbs extends is restrained therein, and said plate has an arm having a hook thereon for effecting selectively said variable restraint of the other limb.

11. A shaft retaining device according to claim 1, in which said cam follower comprises a stud having a body, a head on said body and a socket at an end opposite to said head, said socket defining said female profile for receiving a male profile of said cam, and said resilient member is disposed biasing said head.

12. A shaft retaining device according to claim 1, in which said resilient member comprises a spring about said body of the cam follower and disposed between said head and said sleeve.

13. A shaft retaining device according to claim 12, in which said resilient washer is a belleville washer.

14. A shaft retaining according to claim 11, in which said body extends through said sleeve, said head is externally of said sleeve and said socket is internally of said sleeve and said resilient member in a spring about said body and disposed between said head and said sleeve.

15. A shaft retaining device according to claim 14, in which said body has a noncircular length thereon, said sleeve has an aperture shaped complementary to the cross section of said body through which said length extends snugly therethrough defining said securing means.

16. A shaft retaining device according to claim 1, in which said securing means includes a stop coactive with said sleeve for limiting the extent that the cam follower is biased away from the cam.

17. A shaft retaining device according to claim 1, in which said shaft length and said sleeve define part of a steering column of a vehicle.

* * * * *